United States Patent [19]
Ciliberti, Jr.

[11] 4,179,545
[45] Dec. 18, 1979

[54] BATTERY WITH PROTECTIVELY JACKETED FEMALE TERMINAL

[75] Inventor: Frank L. Ciliberti, Jr., Ossining, N.Y.

[73] Assignee: P. R. Mallory & Co. Inc., Indianapolis, Ind.

[21] Appl. No.: 909,337

[22] Filed: May 25, 1978

[51] Int. Cl.² .............................................. H01M 2/30
[52] U.S. Cl. ...................................... 429/65; 429/178
[58] Field of Search .......................... 429/65, 121–123, 429/156–160, 161, 1, 178, 97, 98, 99; 339/61 R, 62, 252 R, 255 R, 259 R

[56] References Cited
U.S. PATENT DOCUMENTS

| | | | |
|---|---|---|---|
| 2,225,460 | 12/1940 | Porth | 429/123 |
| 3,655,456 | 4/1972 | Hamel | 429/65 |
| 3,861,960 | 1/1975 | Parker et al. | 429/65 X |

Primary Examiner—Anthony Skapars
Attorney, Agent, or Firm—Ronald S. Cornell; Israel Nissenbaum; Charles W. Hoffmann

[57] ABSTRACT

A battery with a female terminal having a jacket which prevents accidental short circuits and maintains resiliency of the terminal.

8 Claims, 2 Drawing Figures

BATTERY WITH PROTECTIVELY JACKETED FEMALE TERMINAL

This invention relates to batteries having female terminals and more particularly to batteries with such female terminals adjacent to male terminals.

In the past, batteries having female terminals such as those found on the common rectangular 9-volt batteries have encountered problems of accidental short circuiting because both female and male terminals are adjacent each other and are thus easily electrically bridged. A most common occurrence of this nature is when the battery is pocketed together with metallic keys. Accordingly, patents such as U.S. Pat. No. 3,655,456 have tried to obviate the problem by providing a terminal protector fastened to the terminal board from which the terminals protrude. However, such arrangement as well as expediencies such as wrapping the entire battery in an insulative wrapper or using protective plastic shields held by the terminals have had a common problem. Batteries having such protective means could not function unless the protective devices were removed prior to usage and in most cases such removal would not allow for a redeployment of the protective means. Accordingly, such protective means were used almost exclusively for protecting the batteries prior to initial sale or use.

It is therefore an object of the present invention to provide a means for protecting against accidental short circuiting between battery terminals even during and after initial electrical connection.

It is a further object of the present invention to provide a means whereby resilient female battery terminals can retain their resiliency for more positive electrical connection.

Figure 1:
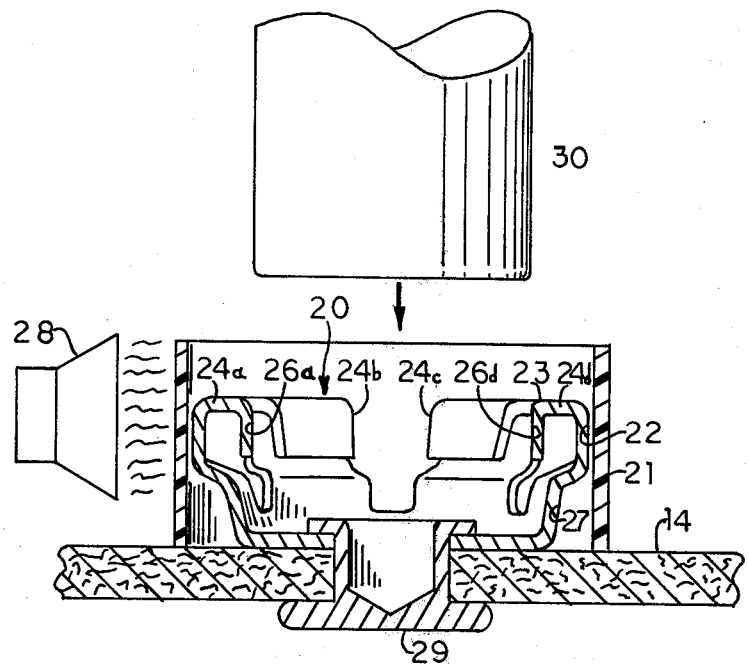
Figure 2:
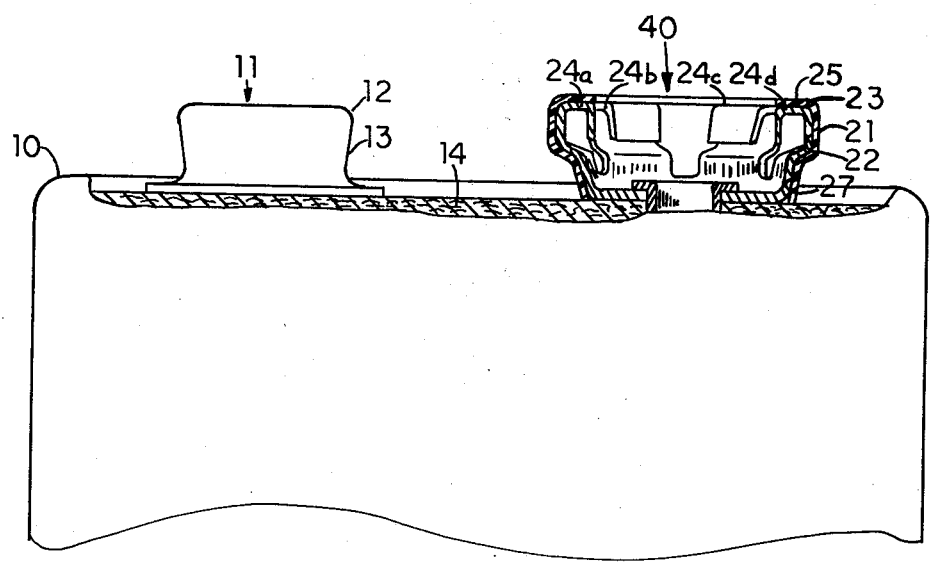

These and other objects, features and advantages of the present invention will be more evident from the following discussion as well as the drawings in which:

FIG. 1 is a cross sectioned elevation view of a female battery terminal with a heat shrink resilient jacket as it is being positioned thereon, and FIG. 2 is an elevation view of the upper section of a battery having the female battery terminal of FIG. 1, protectively jacketed by the heat shrink material, adjacent a male battery terminal, with the female terminal and part of the battery being sectioned for clarity.

Generally, the present invention comprises a battery with a female terminal having an electrically insulative material jacketing the outer lateral surface and upper peripheral edge thereof. Preferably, the insulative material is a heat shrink plastic. Tubing of such material is cut to proper size, peripherally placed around the female battery terminal and thereafter treated with heat whereby the tubing shrinks to closely conform to the outer lateral surface and upper peripheral edge of the female terminal. Overlap of the heat shrunk material into or above the female receptacle area is to be avoided since such overlap may impede electrical connection with a male connector of an electrical device. The jacket thus prevents accidental electrical bridging between adjacent terminals but allows for electrical connection without the need for removing the insulative jacket. The jacket may also serve to retain resiliency of the female terminal during repeated engagements with a male electrical connection. When used for such purpose and accidental inter-terminal connection is unlikely (e.g. when terminals are on opposite ends of a battery) the jacket need not be insulative and may only resiliently buttress the outer lateral surface of the female terminal. Alternatively the material may be made in the form of a premolded part which snaps onto the female terminal.

Referring now to the drawings, FIG. 1 shows a female battery terminal 20 attached to terminal board 14 by rivet 29. Terminal 20 is peripherally enclosed by a tubular section 21 of a heat shrink material having a diameter slightly larger than that of the outer diameter of the terminal defined by lateral surface 22. An additional portion of the tubular heat shrink material 21 extends above the upper surface 23 of the terminal 20. A mandrel 30 having a diameter substantially equivalent to that of a male member to be mated with said female terminal is thereafter positioned (as shown by the arrow) within the female terminal 20. Such diameter is slightly larger than the inner terminal diameter which is for example the distance between surfaces 26a and 26d of opposing spring fingers 24a and 24d respectively. A source of heat such as electrical hot air heater 28 causes the tubular heat shrink material to shrink unto terminal surfaces 22 and 27 with a snug fit. The upper end of the tubular section 21 also shrinks onto the upper terminal surface 23. However, overlapping of the upper end within the inner diameter of the female terminal is prevented by the mandrel 30 which simulates a mating male member's diameter thereby obviating problems of insertion or withdrawal with proper electrical connection of such male member. Alternatively, in place of the mandrel the tubular section may be sized to exact dimensions such that upon shrinkage there will be no overlap of the upper end of the tubular section within the inner diameter of the female terminal.

In FIG. 2 the jacketed female terminal 40 is shown positioned on an electrical battery 14 and adjacent to male terminal member 11. Accidental electrical bridging between male member 11 and female terminal 40 is prevented by insulative jacket 21 which snugly encloses surfaces 22 and 27 of the female terminal as well as overlapping upper edge surface 23 by end section 25. Male connectors having structures such as terminal 11 on an electrical device can engage female terminal 40 without being obstructed by insulative jacket 21. When engaged, spring fingers 24 a–d (and other symmetrically disposed fingers not shown) overlap and hold an enlarged section on a male connector equivalent to section 12 on male terminal 11 and frictionally engage recessed section equivalents of section 13.

The resilient jacket 21 has an additional function. The presence of a resilient jacket enables spring fingers 24 a–d (and the other symmetrically disposed fingers) to maintain their resiliency despite repeated enagement and disengagement with male members which would otherwise cause relaxation of the spring tension of the terminal fingers. Where inter-terminal cell shorting is not problematical the resilient jacket may be used in extending the utilizable life of female terminals having resilient engagement means. When used in such fashion the resilient jacket need only snugly partially enclose the outer lateral surface of the female terminal to buttress the spring fingers of the terminal.

The tubing used as the resilient jacket may be any suitable heat shrinkable plastic. The preferable material is a polyvinylchloride film that is only a few mils in wall thickness. Other examples of heat shrinkable film materials include polyethylene, polypropylene, polyvinylidene chloride, polyester, nylon, etc.

Molded jackets may be made of materials such as polypropylene, polyethylene, polystyrene, ABS, nylon, neoprene and the like and generally the molded jackets are of slightly larger wall thickness than those of the heat shrunk jackets.

It is understood that changes and modifications can be made in the materials and structure of the jacketing means, the female terminal and electrical batteries having such female terminals and the like without departing from the scope of the present invention as defined in the following claims.

What is claimed is:

1. An electric battery having an exposed female terminal protruding from a wall thereof characterized in that said female terminal is jacketed by protective means, with said female terminal substantially supporting said protective means and wherein said protective means permits external electrical connection with said female terminal.

2. The battery of claim 1 wherein said protective means comprises a heat shrunk plastic.

3. The battery of claim 1 wherein said protective means comprises a pre-molded plastic material.

4. The battery of claim 1 wherein said protective means comprises an electric insulator which substantially encloses the outer lateral surface and upper peripheral edge of said female terminal.

5. The battery of claim 1 wherein said protective means comprises a resilient material which resiliently encloses spring fingers of said female terminal.

6. A battery wherein an exposed female terminal and an exposed male terminal are situated on and protrude from one end of said battery, said female terminal being jacketed by protective means, said means permitting electrical engagement with a male member and said means maintaining resilient contact between said female terminal and said male member.

7. The battery of claim 6 wherein said protective means comprises an insulative heat shrunk plastic which substantially encloses the outer lateral surface and upper peripheral edge of said female terminal.

8. The battery of claim 6 wherein said protective means comprises an insulative premolded plastic material.

* * * * *